United States Patent
Vetter et al.

(10) Patent No.: US 11,933,437 B2
(45) Date of Patent: Mar. 19, 2024

(54) HOSE CLAMP

(71) Applicant: OETIKER SCHWEIZ AG, Horgen (CH)

(72) Inventors: Andreas Vetter, Pfäffikon (CH); Maxime Bösiger, Einsiedeln (CH); Markus Widrig, Benken SG (CH)

(73) Assignee: OETIKER SCHWEIZ AG, Horgen (CH)

( * ) Notice: Subject to any disclaimer, the term of this patent is extended or adjusted under 35 U.S.C. 154(b) by 120 days.

(21) Appl. No.: 17/779,217

(22) PCT Filed: Nov. 16, 2020

(86) PCT No.: PCT/EP2020/082276
§ 371 (c)(1),
(2) Date: May 24, 2022

(87) PCT Pub. No.: WO2021/104918
PCT Pub. Date: Jun. 3, 2021

(65) Prior Publication Data
US 2022/0403963 A1    Dec. 22, 2022

(30) Foreign Application Priority Data
Nov. 27, 2019   (EP) ..................................... 19211750

(51) Int. Cl.
*F16L 33/02*       (2006.01)
*F16L 33/025*      (2006.01)

(52) U.S. Cl.
CPC ................. *F16L 33/025* (2013.01)

(58) Field of Classification Search
CPC .................................................. F16L 33/025
See application file for complete search history.

(56) References Cited

U.S. PATENT DOCUMENTS 6,243,924 B1    6/2001   Craig
7,937,812 B2 *  5/2011   Ikeda ..................... F16J 3/042
                                                      24/20 R
(Continued)

FOREIGN PATENT DOCUMENTS

DE    2923766 A1    1/1980
DE    2921031 A1    5/1980
(Continued)

OTHER PUBLICATIONS

International Search Report and Written Opinion—PCT App. No. PCT/EP2020/082276 filed on Nov. 16, 2020, dated Feb. 1, 2021. pp. 1-7.

*Primary Examiner* — David M Upchurch
(74) *Attorney, Agent, or Firm* — David L. Nocilly; Bond Schoeneck & King PLLC

(57) ABSTRACT

A hose clamp for connecting, for example, a hose to a pipe nipple, wherein the hose clamp is made of a clamping band 10 comprising band sections which overlap one another in the closed state of the hose clamp and on which hooks 12, 19 are arranged for closing the hose clamp, and a tightening device 15 arranged in the outer band section for tightening the hose clamp around an object to be clamped, wherein the tightening device comprises two outwardly protruding legs and a bar connecting the legs, wherein at least one corrugated bead 21 extending between the edges of the clamping band and parallel to them is formed on the inner band section of the clamping band, so that at least a part of the corrugated bead is located below the tightening device in the closed state of the clamping band.

7 Claims, 3 Drawing Sheets

(56) References Cited

U.S. PATENT DOCUMENTS

Figure 1:
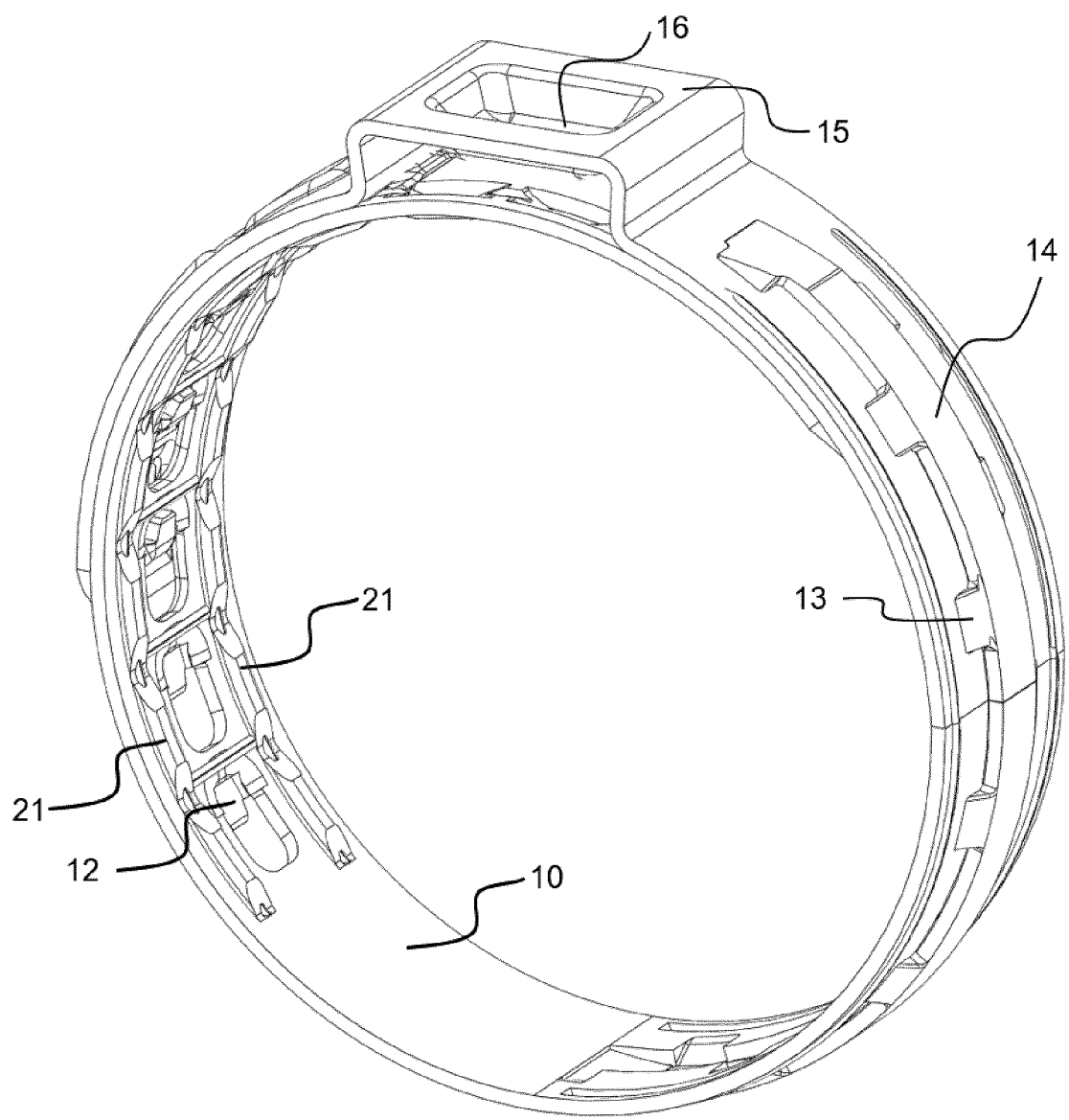

| | | | | |
|---|---|---|---|---|
| 10,066,772 B2 * | 9/2018 | Seelos | ............... | F16L 33/025 |
| 2002/0189055 A1 * | 12/2002 | Oetiker | ............ | F16L 33/025 24/20 CW |
| 2014/0259547 A1 * | 9/2014 | Miessmer | ......... | F16L 33/035 24/268 |

FOREIGN PATENT DOCUMENTS

| | | | |
|---|---|---|---|
| WO | 2015022024 A1 | 2/2015 | |
| WO | 2017005283 A1 | 1/2017 | |

* cited by examiner

HOSE CLAMP

STATE OF THE ART

Hose clamps for connecting a hose to a pipe nipple, for example, are usually designed with a given nominal diameter in such a way that, when tightened, the inner surface of the clamping band is in contact with the hose over its entire circumference without any gaps and a continuous surface pressure is achieved between the hose and the pipe nipple.

A hose clamp is known from WO 2017/005283 A1, in which an ear-like tightening device is formed in the clamping band, the ear-like tightening device being formed by two radially outward protruding legs and a bar connecting them. An appropriate preforming of the tightening device can allow the hose clamp to be set onto the hose with as little clearance as possible. The clamp is then tightened and plastically deformed against the elastic resilience of the preformed tightening device, whereby a narrow and tight fixation of the hose to the pipe nipple is achieved.

In the mounted state, an outer section of the clamping band, which also includes the outward protruding tightening device, overlaps an inner clamping band section. After the hose clamp has been fastened, a portion of the inner clamping band section is located immediately below the tightening device. This portion, situated between the two legs of the tightening device in the outer band section, is, contrary to its two neighbouring portions where the inner band section is reinforced by the immediately adjacent outer band section, less protected against buckling in the radial direction or also torsions.

SUMMARY OF THE INVENTION

The invention is based on the general object of at least partially eliminating disadvantages that occur in comparable hose clamps according to the state of the art. A more specific object of the invention can be seen in the provision of a hose clamp with adjustable diameter having an improved protection against buckling of the clamping band upon bending in the radial direction or against other torsions.

The solution to this problem is achieved with the hose clamp specified in claim 1. In this hose clamp, at least one corrugated bead extending between the edges of the clamping band and parallel to them is formed on the inner band section of the clamping band, so that at least a part of the corrugated bead is located below the tightening device in the closed state of the clamping band. In particular, two corrugated beads extending parallel to each other can be arranged on both lateral peripheries of the clamping band on the inner band section.

By engaging pulling hooks and corresponding positioning hooks in the clamping band, the diameter of the hose clamp in the mounted state can be adjusted within a certain range. Depending on which of the pulling and positioning hooks are engaged with each other, different portions of the clamping band end up in the position below the tightening device in the mounted state. It is therefore advisable to have the corrugated bead or the corrugated beads extend over a section of the clamping band including all portions which could possibly end up in the position below the tightening device with for an appropriate diameter of the hose clamp.

The corrugated bead is formed as a sequence of elongated bead depressions in the sheet metal of the clamping band. In view of their purpose, these depressions are pressed perpendicularly and inwardly in the radial direction into the sheet metal of the clamping band, so that they protrude into the hose material in the mounted state and enhance the hold of the hose clamp to the hose in this state as well as before and upon fastening. During mounting as well as subsequently in operation, the corrugated beads with their wave shape are effective against a contortion of the hose clamp on the hose. Furthermore, the interruptions between the individual depressions of the corrugated beads facilitate the forming of the clamping band by hand, which is advantageous for manufacturing as well as for mounting.

It is also conceivable to form the corrugated bead perpendicularly and outwardly in the radial direction in the clamping band, whereby the additional pressure on the hose can be avoided; in this case, the part of the corrugated bead or the corrugated beads extending beyond the tightening device presses against the inner face of the outer clamping band section. It may therefore be advisable to form corresponding longitudinal beads projecting outwardly for accommodating the corrugated beads in the part of the outer clamping band section adjacent to the tightening device.

In addition to improving bending strength, the corrugated beads also contribute to an increase in tensile strength and thus to an improved force reception in perimeter direction, thereby resulting in an improved overall stability of the hose clamp.

DRAWINGS

Figure 2:
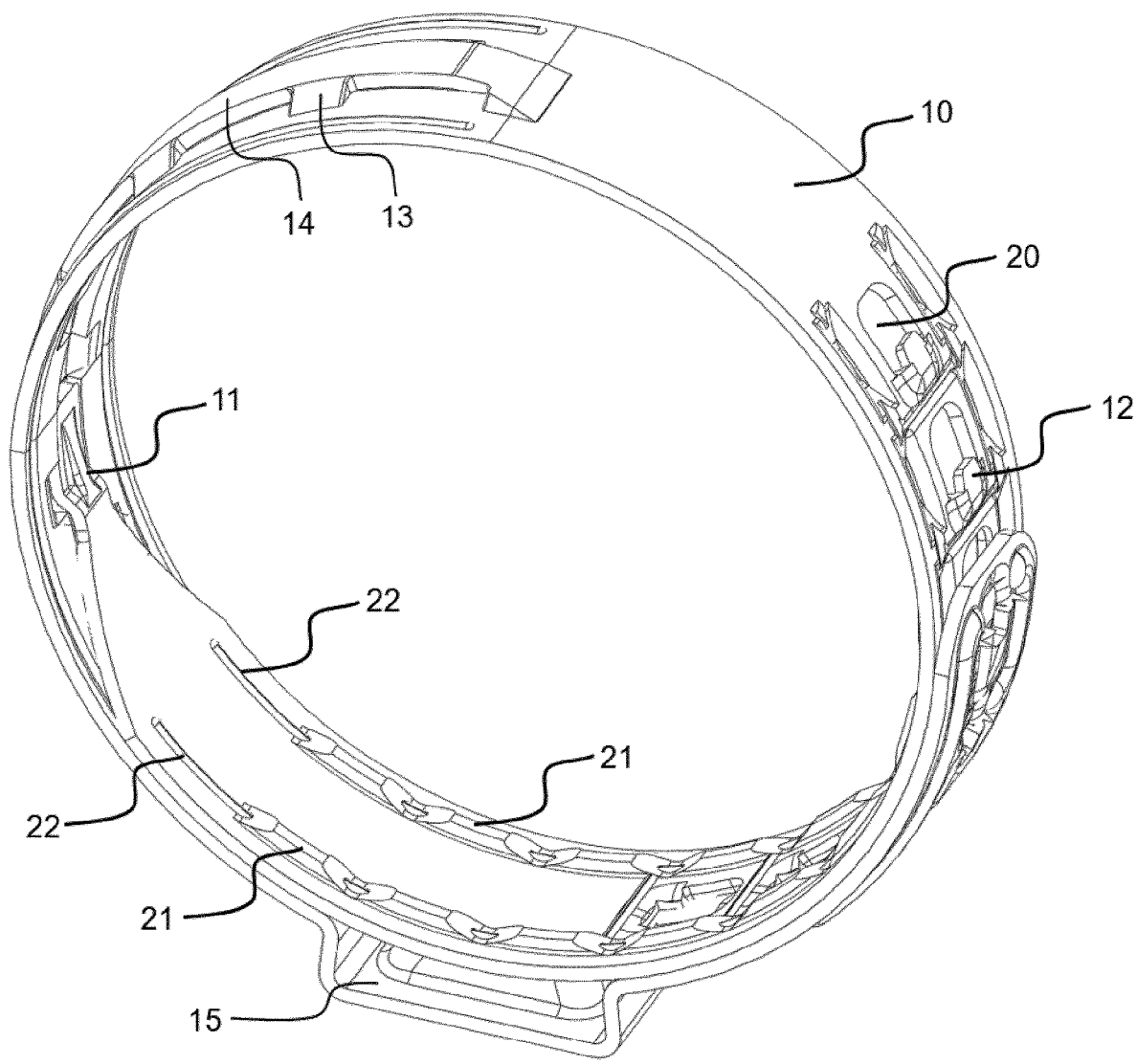
Figure 3:
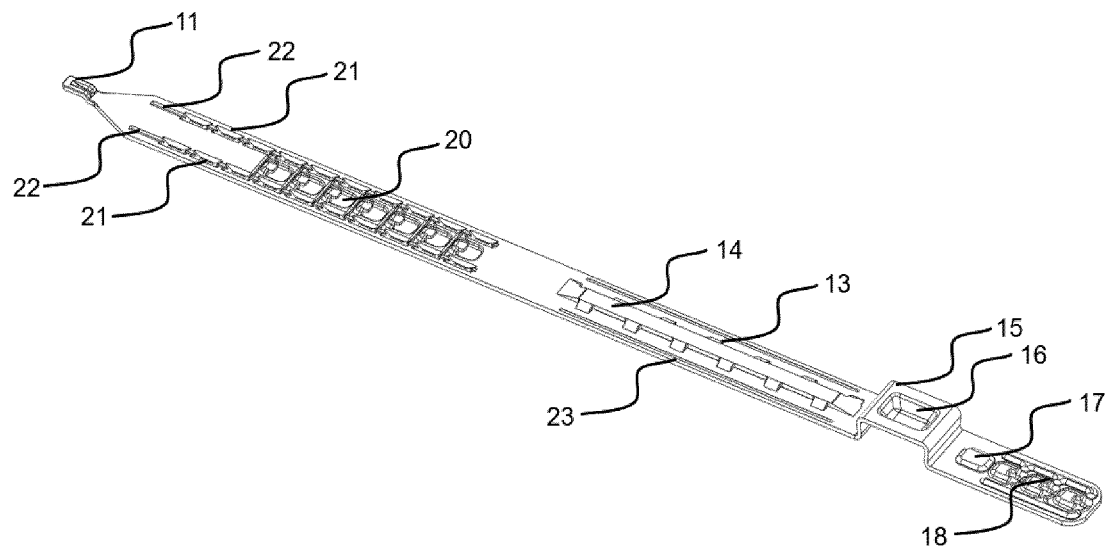
Figure 4:
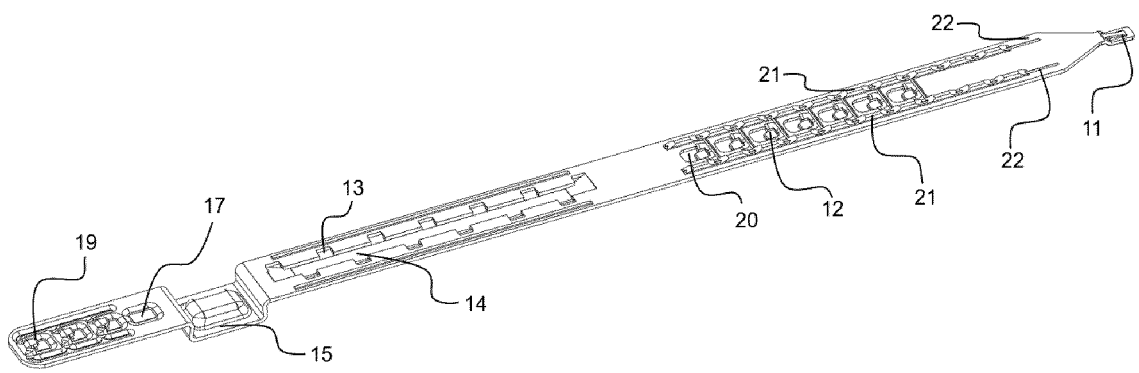

An embodiment of the invention is explained in more detail below with reference to the drawings. Here:

FIG. 1 is a perspective view of a hose clamp according to an embodiment of the invention in the closed state, FIG. 2 is a further perspective view of the hose clamp in the closed state from another viewing angle, FIG. 3 shows the hose clamp in the stretched initial state, viewed from the outer side in the closed state, and FIG. 4 shows the hose clamp in the stretched initial state, viewed from the inner side in the closed state.

EMBODIMENT

The hose clamp according to an embodiment of the invention and shown in FIGS. 1 and 2 consists of an open clamping band 10 which consists of, starting from the inner clamping band end, a tongue 11, a row of positioning hooks 12 (in the example as shown, seven), a band arch 14 cut out from the clamping band 10 by two parallel longitudinal cuts and connected to side parts of the clamping band 10 via flaps 13, a tightening device 15 in the form of a so-called "Oetiker" ear with a pair of outwardly cranked legs and a bar connecting them and reinforced by a bead 16, a release hood 17, as well as three pulling hooks 19 and opening caps 18 in the other outer band section.

Such a hose clamp is intended in particular for sealing and fastening bellows, for example for use in cardan shafts, made of thermoplastic materials or other materials of high Shore hardness that are hard to deform.

In use, the hose clamp which is supplied by the manufacturer in the closed state, is pulled axially onto the item to be tied, such as a pipe nipple and a hose surrounding it or, alternatively, opened for radial assembly and placed around the material to be tied, with the tongue 11 ending up positioned under the band arch 14.

The three pulling hooks 19 in the outer band section are then engaged with the positioning hooks 12 arranged in the inner band section, which correspond to the smallest possible diameter of the respective material to be tied.

In the example shown, there are three pulling hooks 19. Depending on the force and strength requirements, two pulling hooks or a single pulling hook may be sufficient or more than three pulling hooks 19 may be required.

The number of positioning hooks 12 is greater than that of the pulling hooks 19 in order to allow for a corresponding range of variation in the clamp diameter. In the embodiment shown, seven positioning hooks 12 are provided. In FIG. 1, the hose clamp is closed at a medium diameter. For the smallest closed diameter, the middle one of the seven positioning hooks 12 would in this case be underneath the release cap 17, and the three positioning hooks 12 towards the band middle would be in engagement with the three pulling hooks 19.

The hose clamp according to the invention comprises two corrugated beads 21 extending in the longitudinal direction. The corrugated beads 21 extend in parallel to each other at the side edges 10 of the clamping band in a region from the tongue 11 to the last one of the positioning hooks 12. This region is chosen such that independently of the diameter with which the hose clamp is fixed on the hose, it can be ensured that a respective part of the corrugated beads 21 is positioned below the tightening device 15 in the mounted state. Depending on the configuration of the hose clamp, also another region for the corrugated bead, in particular a smaller or larger region, can satisfy this criterion.

As shown in particular in FIGS. 3 and 4, each positioning hook 12 is arranged in a clearance window 20 cut out from the clamping band 10. It comprises a lug which is connected to the clamping band 10 at its edge facing away from the tightening device 15 and which extends essentially in parallel to the clamping band 10. At the transition to the lug, a step is formed radially inwardly and facing away from the tightening device 15.

The pulling hooks 19 are each curved dome-like radially inwards and have a lug which engages over the lug of the positioning hook 12. The opening cap 18, which is formed radially outwards on the opposite side of the pulling hook, provides the necessary space for the positioning hook 12, so that the lug of the pulling hook 19 can engage over the lug 21 of the positioning hook 12. At the transition to the lug, a step is formed radially outwards and facing the tightening device 15.

The lugs of the positioning and pulling hooks 12, 19 hold the outer and inner clamping band sections on top of each other, while the force is transmitted between transverse surfaces of the pulling hooks 19, which are transverse to the longitudinal direction of the clamping band 10, and transverse surfaces of the positioning hooks 12, which are transverse to the longitudinal direction of the clamping band 10, when the hose clamp is tightened.

Depending on the configuration length of the lugs, the step of the positioning hook 12 can abut with the free end of the lug of the pulling hook 19 and the step of the pulling hook 19 can abut with the free end of the lug of the positioning hook 12 in the closed state of the hose clamp, which generates a secondary force transmission location and results in a mutual stabilisation of the hooks arranged on the inner band section and the outer band section.

In the closed state of the hose clamp, three of the positioning hooks 12 are in engagement with the pulling hooks 19. Depending on the hose diameter, the positioning hooks for the engagement with the pulling hooks are selected such as to ensure the desired tight closure. On the tongue side, a part of the inner end of the band reaches the position underneath the tightening device 15. The lateral corrugated beads 21 provided in the appropriate part of the clamping band 10 stabilise the clamping band 10 against buckling in the radial direction underneath the tightening device 15. The corrugated beads 21 can be configured in the form of interrupted grooves or as a series of individual beads. On both sides of the clamping band 10, they merge into continuous groove-shaped reinforcement beads 22 (alternatively or additionally, the corrugated beads can also be continued as such continuous reinforcement beads in the direction towards the tightening device).

In addition to the corrugated beads 21, lateral reinforcement beads 23 in continuous groove shape are provided in the embodiment in the region of the band arch 14 which forms a tongue channel for the tongue and receives it in the closed state. Breakage frequently occurs in the region of the band arch 14, so that additional reinforcement beads 23 can contribute here effectively to a stabilization of the band arch region.

In the present embodiment, the continuous reinforcement beads 22, 23 are provided both in the area of the positioning hooks 12 and in the area of the band arch 14 in order to jointly contribute to the overall stability of the hose clamp. However, it is also conceivable to provide in addition to the corrugated beads 21 only the reinforcement beads 22 or only the reinforcement beads 23.

In the embodiment, the pulling hooks 19 and opening hoods 18 are further surrounded by reinforcement beads stamped into the clamping band 10, which increase the bending stiffness for any given material strength and which allow the transmission of larger forces.

For the same reason, the clearance windows 20 of the positioning hooks 12 are stiffened by embossments between the windows 20 and the side edges of the clamping band 10.

REFERENCE NUMBERS 10 clamping band
11 tongue
12 positioning hook
13 flaps
14 band arch
15 tightening device
16 bead
17 release cap
18 opening hood
19 pulling hook
20 clearance window
21 corrugated bead
22 reinforcement bead
23 reinforcement bead

The invention claimed is:

1. A hose clamp, comprising:
   a clamping band (10) having band sections which overlap one another in the closed state of the hose clamp and on which hooks (12, 19) are arranged for closing the hose clamp, and a tightening device (15) arranged in the outer band section for tightening the hose clamp around an object to be clamped:
   wherein the tightening device comprises two outwardly protruding legs and a bar connecting the legs; and
   wherein at least one corrugated bead (21) extending between the edges of the clamping band and parallel to them is formed on the inner band section of the clamping band, so that at least a part of the corrugated bead is located below the tightening device in the closed state of the clamping band.

2. The hose clamp according to claim 1, wherein the at least one corrugated bead (21) comprises a sequence of radially inwardly directed depressions in the clamping band (10), extending in the longitudinal direction of the clamping band.

3. The hose clamp according to claim 1, wherein the at least one corrugated bead (21) comprises of a sequence of radially outwardly directed depressions in the clamping band (10), extending in the longitudinal direction of the clamping band.

4. The hose clamp according to claim 1, wherein two corrugated beads (21) extending parallel to each other are arranged on the respective lateral peripheries of the clamping band on the inner band section.

5. The hose clamp claim 1, wherein the inner diameter of the hose clamp in the closed state can be adjusted to different hose diameters using hooks (12, 19) at the overlapping band sections, and wherein the length of the at least one corrugated bead (21) is such that, independently of how tight the hose clamp is fastened around the hose, a part of the corrugated bead or the corrugated beads is located below the tightening device (15) in the closed state of the hose clamp.

6. The hose clamp according to claim 1, wherein the at least one corrugated bead or corrugated beads (21) are continued on one end or on both ends by respective reinforcement beads (22) which extend continuously and are formed radially inwardly or radially outwardly.

7. The hose clamp according to claim 1, wherein the bar connecting the legs of the tightening device (15) comprises a closed reinforcement bead (16) directed concavely inwardly.

* * * * *